Patented July 8, 1930

1,770,010

UNITED STATES PATENT OFFICE

JOSEPH BARON PAYMAN AND HENRY ALFRED PIGGOTT, OF HUDDERSFIELD, ENGLAND, ASSIGNORS TO BRITISH DYESTUFFS CORPORATION LIMITED, OF MANCHESTER, ENGLAND

REMOVAL OF FREE CHLORINE AND BROMINE FROM FLUID MIXTURES

No Drawing. Application filed April 23, 1928, Serial No. 272,360, and in Great Britain April 27, 1927.

In the chlorination and bromination of organic products there is always produced as a by-product hydrochloric acid or hydrobromic acid gas which may be collected in water. The resulting halogen acid is always contaminated with free halogen, which reduces its value.

Other similar cases where chlorine or bromine is present in fluid mixtures as a harmful impurity are well known. Thus, in the production of cyanogen chloride or cyanogen bromide by halogenation of hydrocyanic acid, the product also contains free halogen which is highly deleterious.

Ordinary chlorine absorbents such as sodium thiosulphate, or alkaline scrubbing media, are obviously inapplicable in cases such as those mentioned.

It has been heretofore proposed in the purification of fluid mixtures containing chlorine or bromine, to treat the same with various liquids to extract the chlorine and bromine, the liquids being of such a nature that they will dissolve the chlorine or bromine. Such processes require that the extracting liquid and the fluid mixture be brought into intimate and uniform contact. Under industrial conditions it is mechanically and physically very difficult to secure the required intimate and uniform mixture. Expensive and complicated apparatus is necessary. After the chlorine or bromine have been removed by the extracting liquid, the extracting liquid now containing the chlorine or bromine must then be separated from the more or less purified fluid mixture. This separation must be such, that the fluid mixture will not be contaminated by residual extracting liquid. Such complete separation usually presents many difficulties. The more efficient the mixing step is, the more difficult is the subsequent separation of the extracting liquid from the purified fluid mixture. In the prior processes the chlorine or bromine may be more or less perfectly removed from the mixture containing it by treatment with an extracting liquid but the so treated fluid mixture is then contaminated with a certain amount of the extracting agent.

We have now found that fluid mixtures containing free chlorine or bromine or both, can be effectively freed from such chlorine or bromine by treating the fluid mixture with a solid hydrocarbon capable of forming additive compounds with chlorine or bromine. The fluid mixture containing free chlorine or bromine can be simply passed through a permeable layer of the solid hydrocarbon acting as a sort of filter. The solid hydrocarbon reacts with the chlorine or bromine to form additive compounds, thereby fixing and removing the chlorine or bromine from the fluid mixture which passes on otherwise unchanged. As the purifying agent is in the form of a solid, separation from the purified fluid mixture is easily accomplished. Our process is a simple and direct means of purifying fluid mixtures from chlorine or bromine and eliminates mechanical and other difficulties encountered in prior processes.

The chlorine or bromine, or both, contained in acid vapors can be effectively removed by passing the acid vapors through a layer of solid naphthalene, which completely removes every trace of the deleterious impurity. The naphthalene treatment can also be applied to liquids, for example, the liquid hydrochloric acid or hydrobromic acid obtained as described above may be agitated with solid naphthalene, or the acid may be filtered through a bed containing solid naphthalene. In both cases the naphthalene retains the free halogen and the acid is obtained free from that impurity. Other solid hydrocarbons can be used instead of naphthalene. Any solid hydrocarbon capable of forming additive products with chlorine or bromine can be used. In particular, we mention as instances, anthracene, solid olefines and the like. The treatment is the same as that when naphthalene is used. The impure liquid acid may be agitated with the solid hydrocarbon or may be filtered through a bed containing the solid hydrocarbon.

What we claim and desire to secure by Letters Patent is:—

1. A process for removing free chlorine or bromine from fluid mixtures containing the same, which comprises treating said fluid mixtures with a solid hydrocarbon capable of forming additive compounds with chlorine or bromine.

2. A process for removing free chlorine or bromine from fluid mixtures containing acid of the type HR, wherein R represents Cl or Br, which comprises treating said fluid mixtures with a solid hydrocarbon capable of forming additive compounds with chlorine or bromine.

3. A process for removing free chlorine or bromine from fluid mixtures which comprises passing acid gases containing the same through a layer of solid hydrocarbon capable of forming additive compounds with chlorine or bromine.

4. A process for removing free chlorine or bromine from fluid mixtures which comprises passing a solution of acid gases containing the same through a layer of solid hydrocarbon capable of forming additive compounds with chlorine or bromine.

5. A process according to claim 1 in which the solid hydrocarbon is naphthalene.

In testimony whereof we affix our signatures.

JOSEPH BARON PAYMAN.
HENRY ALFRED PIGGOTT.